(12) United States Patent
Smith et al.

(10) Patent No.: US 6,503,043 B1
(45) Date of Patent: Jan. 7, 2003

(54) MULTIPLE LEVEL LOADING APPARATUS AND METHOD

(75) Inventors: Jerry Wayne Smith, Advance, NC (US); Marlin H. Thompson, Boones Mill, VA (US)

(73) Assignee: LeBleu Corporation, Advance, NC (US)

( * ) Notice: Subject to any disclaimer, the term of this patent is extended or adjusted under 35 U.S.C. 154(b) by 0 days.

(21) Appl. No.: 09/690,202

(22) Filed: Oct. 17, 2000

(51) Int. Cl.[7] ............................................. B65G 69/24
(52) U.S. Cl. ............................ 414/331.14; 414/331.13; 414/331.18
(58) Field of Search ................... 414/331.01, 331.04, 414/331.08, 331.11, 331.13–331.16, 331.18, 280

(56) References Cited

U.S. PATENT DOCUMENTS

| | | | | |
|---|---|---|---|---|
| 2,661,100 A | * | 12/1953 | Ashford | 198/429 |
| 3,492,704 A | * | 2/1970 | Schwellenbach | 414/280 |
| 3,637,095 A | * | 1/1972 | Kampfer | 214/16.6 |
| 4,016,986 A | * | 4/1977 | Thomas | 110/177 |
| 4,634,333 A | * | 1/1987 | Butterly et al. | 187/251 |
| 5,106,259 A | * | 4/1992 | Anderson et al. | 414/331 |
| 5,310,300 A | * | 5/1994 | Crabb et al. | 198/408 |
| 5,325,953 A | * | 7/1994 | Doster et al. | 198/304 |
| 5,435,690 A | * | 7/1995 | Binning | 414/791.6 |
| 6,003,654 A | * | 12/1999 | Webber et al. | 198/408 |
| 6,201,203 B1 | * | 3/2001 | Tiles | 209/540 |

* cited by examiner

Primary Examiner—Eileen D. Lillis
Assistant Examiner—Charles A. Fox
(74) Attorney, Agent, or Firm—Myers Bigel Sibley & Sajovec

(57) ABSTRACT

A loading apparatus for vertically stacking a plurality of articles includes a staging assembly. The staging assembly includes a staging platform configured to receive and support the articles. The staging platform is vertically movable to a plurality of vertical levels. The staging assembly further includes a lift drive to raise and lower the staging platform, and a positioning system to move the articles off of the staging platform at selected ones of the plurality of levels. A conveyor assembly is configured to transport the articles to the staging assembly. The positioning system may be operable to remove the articles from the conveyor assembly and position the articles on the staging platform. The positioning system may be operative to position the articles on the staging platform while the lift drive is raising or lowering the staging platform. The conveyor assembly may include a transfer conveyor and a staging conveyor configured to receive the articles from the transfer conveyor, the staging conveyor being movable with the staging platform and pivotally connected to the transfer conveyor.

21 Claims, 9 Drawing Sheets

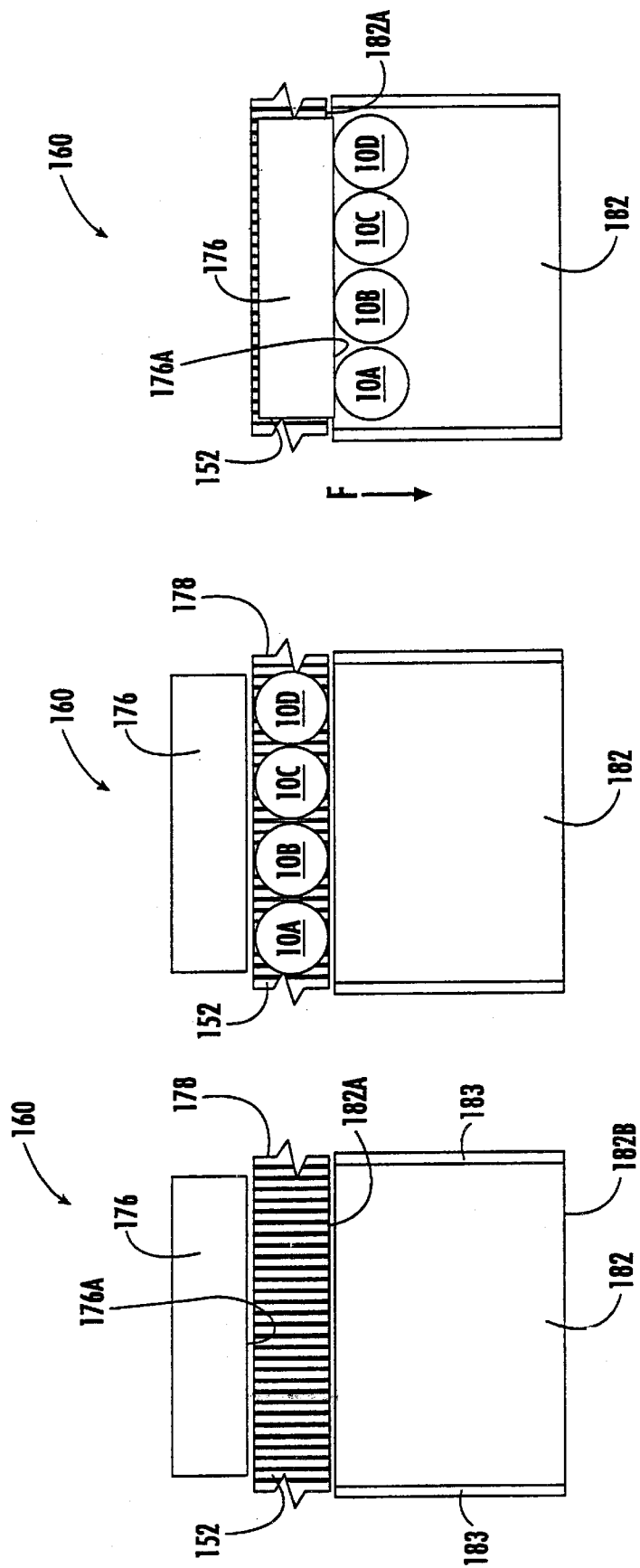

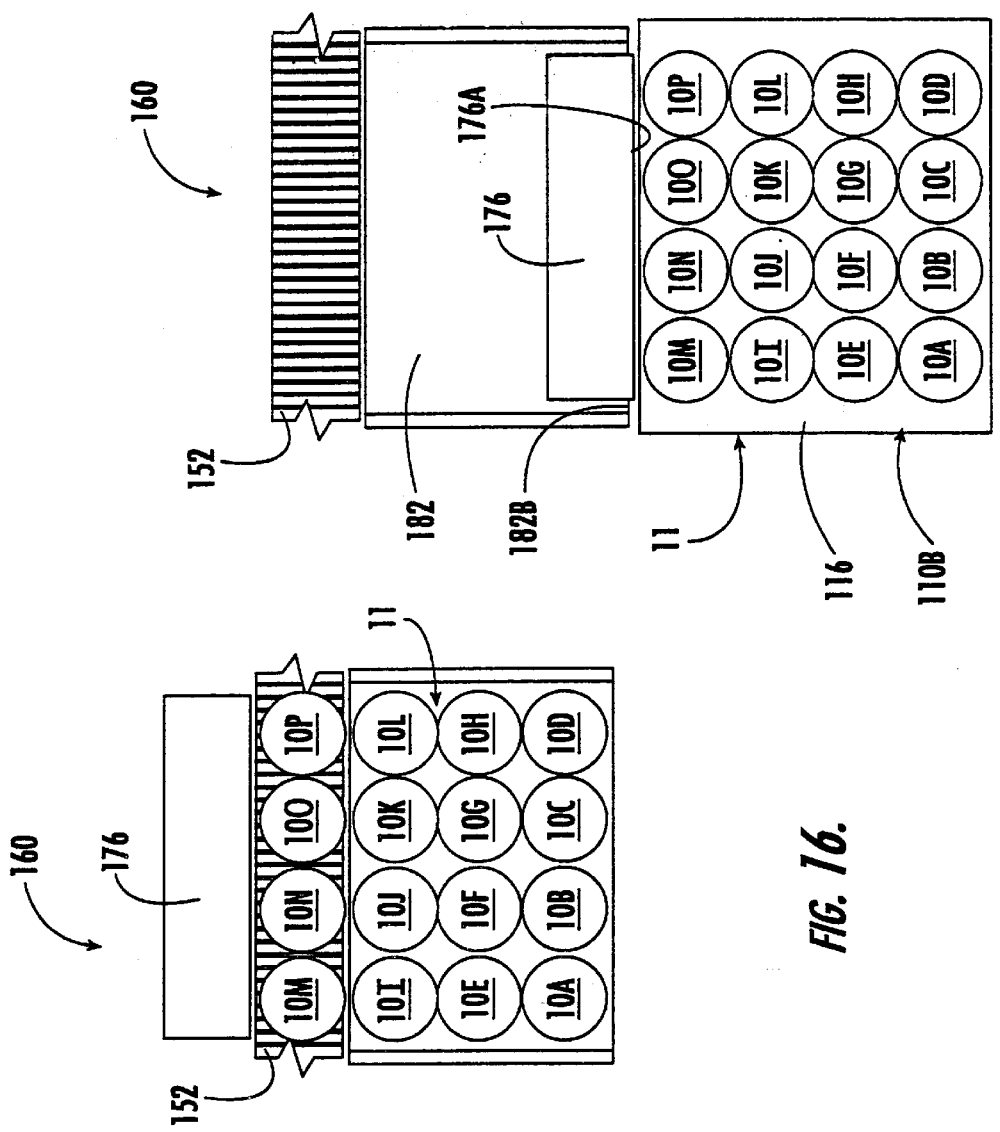
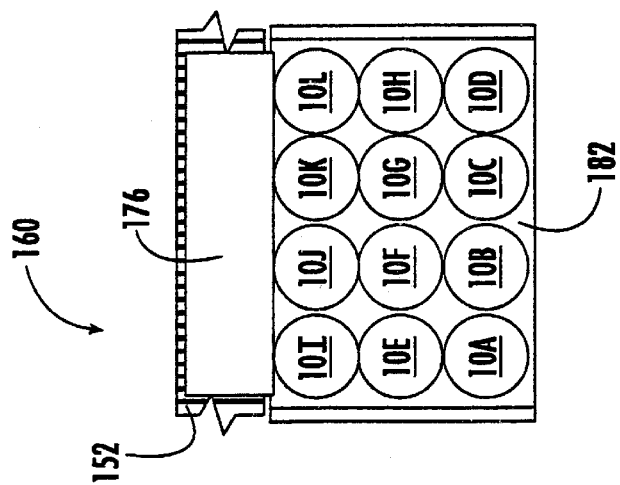
*FIG. 17.*
*FIG. 16.*
*FIG. 15.*

MULTIPLE LEVEL LOADING APPARATUS AND METHOD

FIELD OF THE INVENTION

The present invention relates to apparatus and methods for transporting and loading articles and, more particularly, to apparatus and methods for loading articles at multiple levels.

BACKGROUND OF THE INVENTION

It is often necessary to load a plurality of articles on different levels. For example, a plurality of articles such as bottles may be placed on respective vertically spaced shelves of a transport or holding rack. By way of further example, a plurality of articles may be stacked one on top of the other so that each subsequent article or layer of articles must be placed at a higher level than the previous level. Such loading operations are often accomplished by manual labor.

SUMMARY OF THE INVENTION

According to embodiments of the present invention, a loading apparatus for placing a plurality of articles on a plurality of vertically stacked shelves of a rack includes a staging assembly. The staging assembly includes a staging platform configured to receive and support the articles. The staging platform is vertically movable to a plurality of positions adjacent the shelves of the rack. A lift drive is provided to raise and lower the staging platform. A positioning system is provided to position the articles on the staging platform and to move the articles onto the shelves of the rack. A conveyor assembly is configured to transport the articles to the staging assembly.

Preferably, the positioning system is operative to position the articles on the staging platform while the lift drive is raising or lowering the staging platform.

The conveyor assembly may include a transfer conveyor and a staging conveyor configured to receive the articles from the transfer conveyor. The staging conveyor is movable with the staging platform and pivotally connected to the transfer conveyor.

Preferably, the staging platform is configured to support an array of the articles and the transfer conveyor is configured to transport the articles seriatim. The positioning system is operative to position rows of the articles from the conveyor assembly onto the staging platform to form an array of the articles and to thereafter move the array of articles from the staging platform onto a shelf of the rack. The conveyor assembly may be operative to position the articles adjacent the staging platform such that the articles are aligned along an axis, with the positioning system being operative to push the articles onto the staging platform in a direction substantially perpendicular to the axis.

The loading apparatus may include a rack conveyor system comprising a rack drive. The rack drive is operable to position the rack adjacent the staging platform.

According to embodiments of the present invention, a loading apparatus for vertically stacking a plurality of articles includes a staging assembly. The staging assembly includes a staging platform configured to receive and support the articles. The staging platform is vertically movable to a plurality of vertical levels. A lift drive is provided to raise and lower the staging platform. A positioning system is provided to move the articles off of the staging platform at selected ones of the plurality of levels. A conveyor assembly is configured to transport the articles to the staging assembly.

The positioning system may be operable to remove the articles from the conveyor assembly and position the articles on the staging platform. The conveyor assembly may include a transfer conveyor and a staging conveyor configured to receive the articles from the transfer conveyor, the staging conveyor being movable with the staging platform and pivotally connected to the transfer conveyor.

According to further embodiments of the present invention, a method for placing a plurality of articles on a plurality of vertically stacked shelves of a rack includes raising or lowering a staging platform to a position adjacent a selected shelf of the rack. The articles are placed on the staging platform while the staging platform is raising or lowering. Thereafter, the articles are moved from the staging platform to the selected shelf.

The step of placing the articles on the support platform may include transporting the articles to a position adjacent the staging platform while the staging platform is raising or lowering, and pushing the articles onto the staging platform while the staging platform is raising or lowering. The step of placing the articles on the support platform may include: transporting a first row of the articles to a position adjacent the staging platform while the staging platform is raising or lowering; thereafter, pushing the first row of the articles onto the staging platform while the staging platform is raising or lowering; thereafter, transporting a second row of the articles to a position adjacent the staging platform while the staging platform is raising or lowering; thereafter, pushing the second row of the articles onto the staging platform and adjacent the first row of the articles while the staging platform is raising or lowering to form an array of the articles on the staging platform; and, thereafter, pushing the array of the articles from the staging platform onto the selected shelf of the rack.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

FIGS. 9–16 are partial, schematic, top views of the staging assembly of the loading apparatus of FIG. 1, illustrating the loading of articles thereon; and FIG. 17 is a partial, schematic, top view of the staging assembly of the loading apparatus of FIG. 1 and a shelf of an associated rack, illustrating the transfer of an array of the articles from the staging assembly to the shelf.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
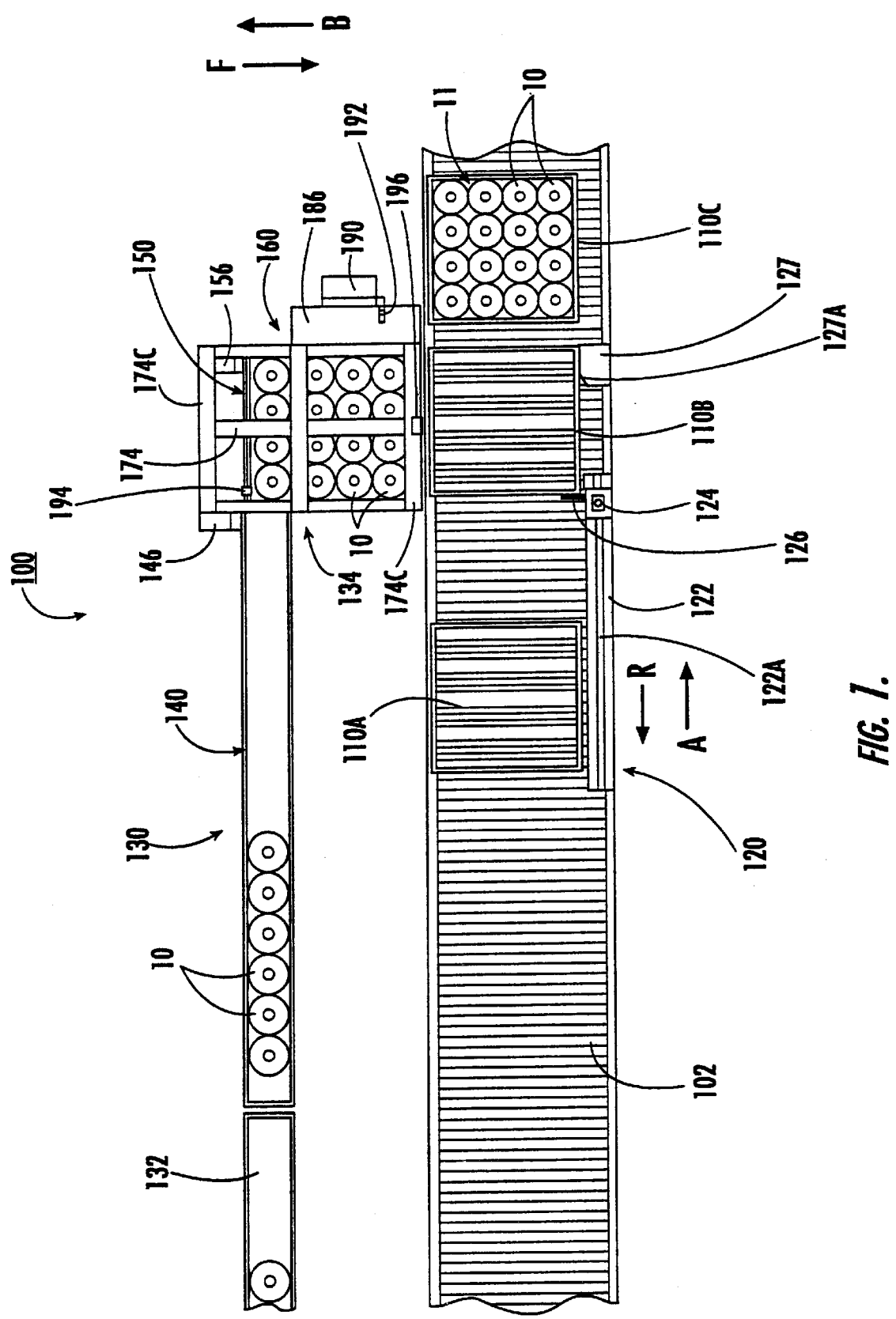
FIG. 1 is a top, schematic view of a loading apparatus according to the present invention.
Figure 6:
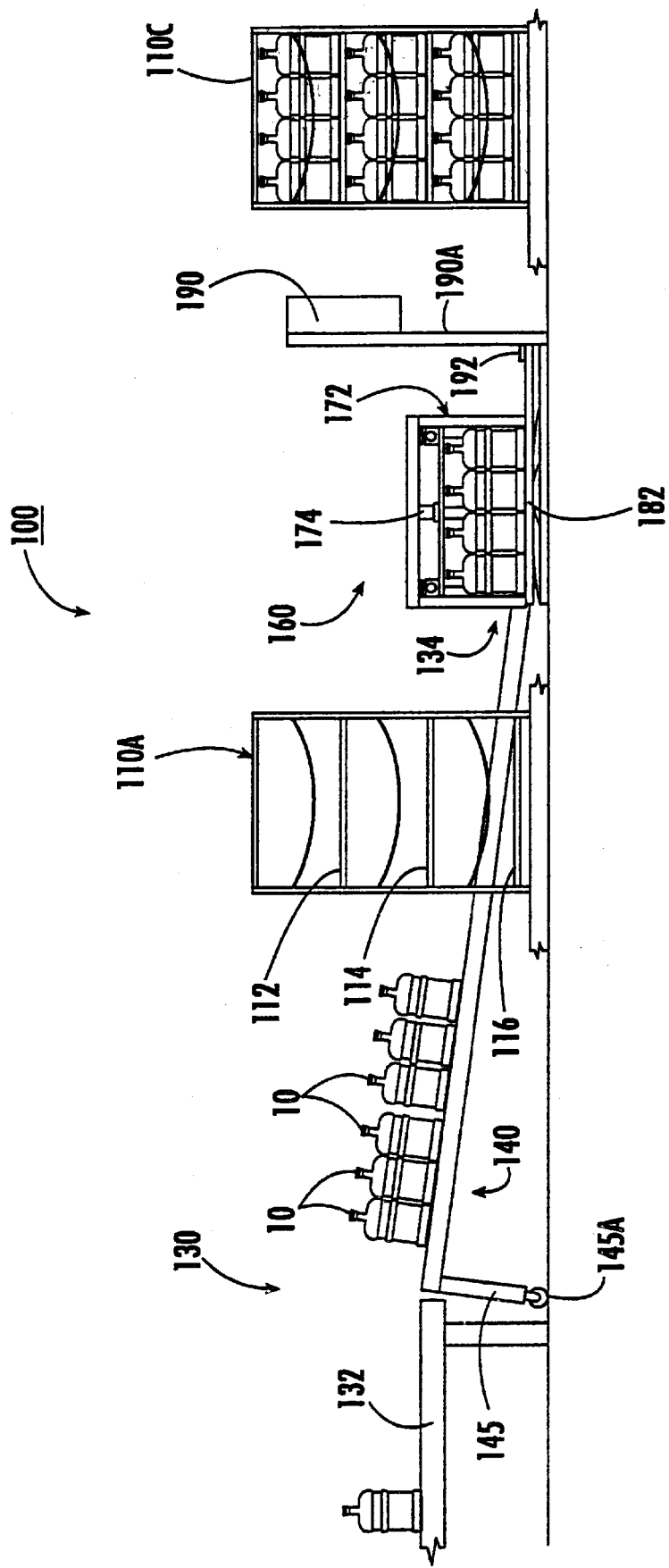
FIG. 6 is a side, schematic view of the loading apparatus of FIG. 1 wherein a lift thereof is in a fully lowered position.

With reference to FIGS. 1 and 6–8, a loading apparatus according to the present invention is shown therein and designated 100. As best seen in FIG. 1, the loading apparatus 100 includes a rack conveyor system 120, a loading conveyor system 130 and a staging assembly 160. A series of racks (exemplified at 110A, 110B, 110C) are sequentially transported by the conveyor system 120 to a position adjacent the staging assembly 160 (for clarity, the rack 110B is omitted from FIGS. 6–8). A series of articles (illustratively shown as bottles 10) are sequentially transported to the staging assembly 160 by the loading conveyor system 130. As shown in FIG. 6, each rack 110A, 110B, 110C includes three spaced apart, vertically stacked shelves 112, 114, 116. The staging assembly 160 assembles and configures the articles 10 and then pushes the articles 10 onto the racks 110A, 110B, 110C. More particularly, the staging assembly 160 loads an array of the articles 10 onto each of the shelves 112, 114, 116, which are disposed at different vertical levels. A controller 190 synchronizes and controls the operations of the subsystems of the loading apparatus 100.

With reference to FIG. 1, the rack conveyor system 120 includes a floor conveyor 102. Preferably, the floor conveyor 102 is a non-driven conveyor including opposed side rails and a series of free rollers mounted in the side rails and having their axes extending transversely across the conveyor 102. Preferably, the side rails extend upwardly above the rollers to prevent the racks from traveling over the side edges of the conveyor 102.

A rack drive 122 is fixed along the conveyor 102. A suitable drive mechanism such as a hydraulic or pneumatic cylinder, a step motor or the like is housed in the rack drive 122. A shuttle 124 is slidably mounted on a guide rail 122A of the rack drive 122. The drive mechanism is coupled to the shuttle 124 to selectively drive the shuttle 124 along the rail 122A in either of a return direction R and an opposed advance direction A, each of which is parallel to the direction of travel of the conveyor. A spring-biased latch 126 attached to the shuttle 124 extends inwardly from the shuttle 124 and is rotatable about a vertical axis.

In FIG. 1, the latch 126 is shown in a locked, carrying position. When the shuttle 124 is driven back in the direction R, the latch 126 will strike the leading edge of the rack 110A and pivot clockwise to allow the shuttle 124 to return to the far left end of the rack drive 122 without significantly moving the rack 110A. Once the latch 126 clears the rack 110A, the spring bias will cause the latch 126 to again assume the locked position. The shuttle 124 is driven toward the right end of the rack drive 122, whereupon the latch 126 engages the trailing edge of the rack 110A to pull the rack 110A forward with the shuttle 124.

As the rack 110A is pulled into position in front of the staging assembly 160, a guide block 127 positively laterally positions the rack 110A. The guide block 127 includes a tapered leading edge 127A to assist in guiding the rack. A proximity sensor 196 confirms that a rack is in position in front of the staging assembly 160 and signals the controller 190 accordingly. The foregoing procedure is executed for each of the racks 110A, 110B, 110C.

Figure 5:
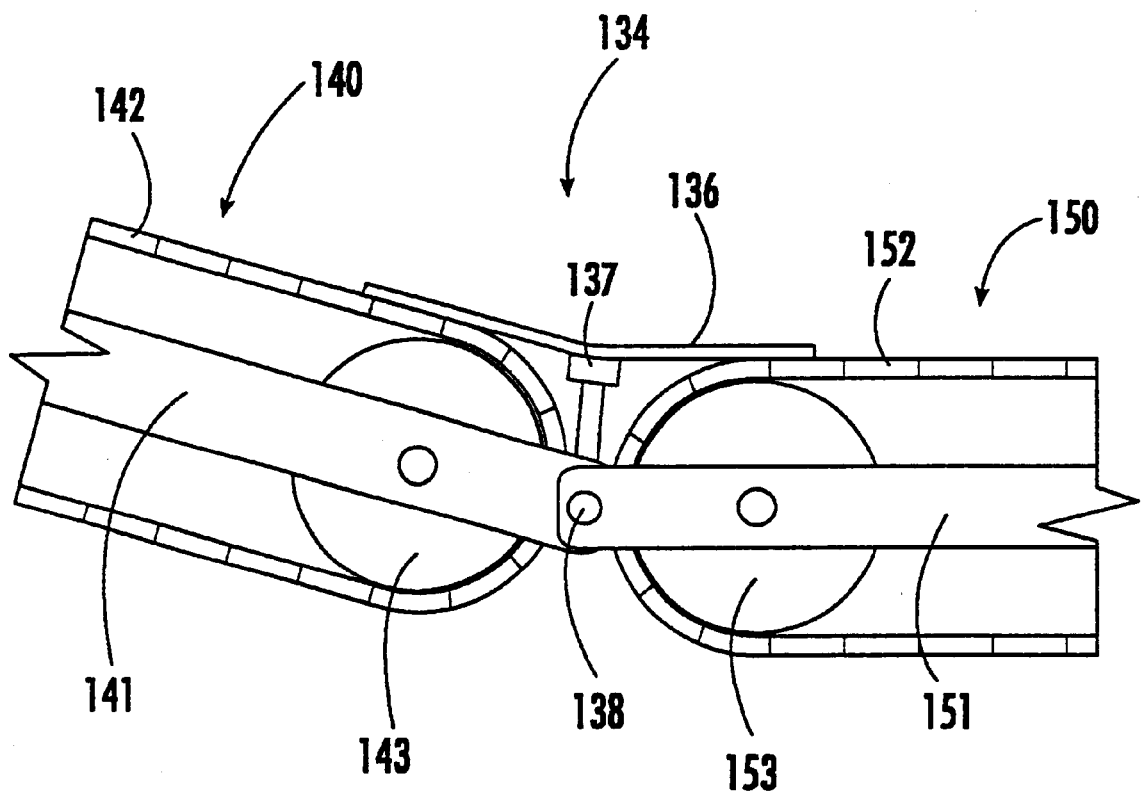
FIG. 5 is an enlarged, fragmentary side view of a conveyor hinge of the loading apparatus of FIG. 1.
Figure 7:
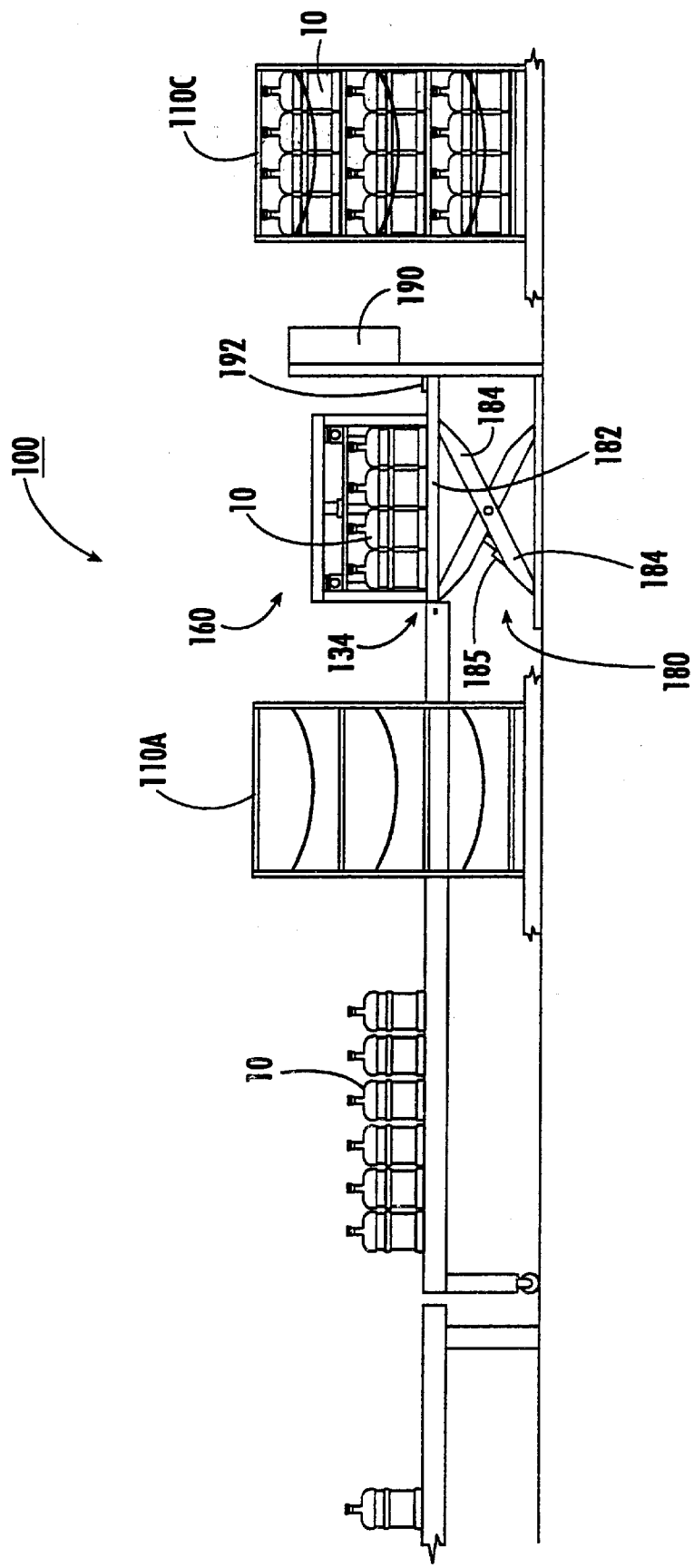
FIG. 7 is a side, schematic view of the loading apparatus of FIG. 1 wherein the lift is in an intermediate level position.
Figure 8:
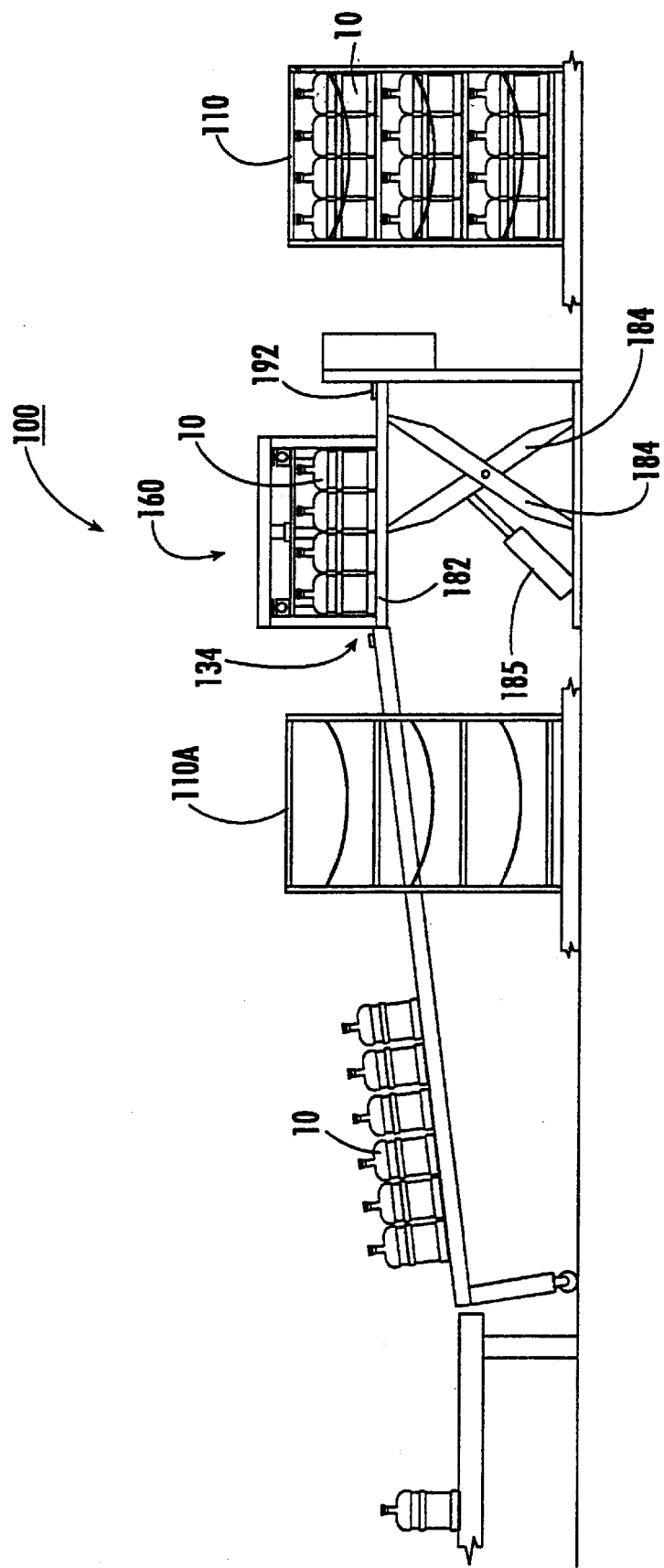
FIG. 8 is a side, schematic view of the loading apparatus of FIG. 1 wherein the lift is in a fully raised position.

The conveyor system 130 includes a transfer conveyor 140. The conveyor 140 receives articles 10 from an existing conveyor 132 or other suitable source. For example, the conveyor 140 may alternatively be loaded by hand. With reference to FIG. 5, the conveyor 140 includes an endless belt 142 mounted on a frame 141 and rollers 143. The belt 142 is driven by a gear motor 146 (see FIG. 1). The conveyor 140 includes a supporting leg 145 having a roller or other suitable pivot 145A which allows the opposing end of the conveyor 140 to be tilted upwardly and downwardly as shown in FIGS. 6–8 and discussed in more detail below.

As best seen in FIGS. 1, 2, 4, 5 and 9, the conveyor system 130 also includes a staging conveyor 150. The staging conveyor 150 includes an endless belt 152 mounted on a frame 151 and rollers 153. The belt 152 is driven by a gear motor 156 (see FIG. 1). The frame 151 is directly or indirectly fixed to a staging platform 182 (described in more detail below).

The frame 151 is joined to the frame 141 by a hinge bolt 138 to form a conveyor hinge 134. The conveyor hinge 134 allows pivotal movement between the conveyors 140, 150 about a horizontal axis. A bracket 137 is secured to either of the frames 141, 151 and extends upwardly between the belts 142, 152. A flexible, resilient plate 136 is secured to the bracket 137 and overlaps each of the belts 141, 151. The plate 136 is preferably formed of nylon or a similar flexible, low-friction material. The plate 136 facilitates a smooth transition of the articles over the conveyor hinge 134 and from the conveyor 140 to the conveyor 150.

As best seen in FIGS. 1–4 and 7–9, the staging assembly 160 includes a lift 180 having scissored legs 184 and a drive unit 185. The drive unit 185 is controllable by the controller 190 and may be any suitable drive mechanism, such as a hydraulic or pneumatic cylinder (as shown) or a step motor. The staging platform 182 is mounted on the legs 184. The staging platform 182 can be continuously and selectively vertically raised and lowered by selectively extending and retracting the drive unit 185. More particularly, the staging platform 182 can be lowered at least as low as about the level of the lower shelf 116 (see FIG. 1) and raised at least as high as about the upper shelf 112.

Figure 2:
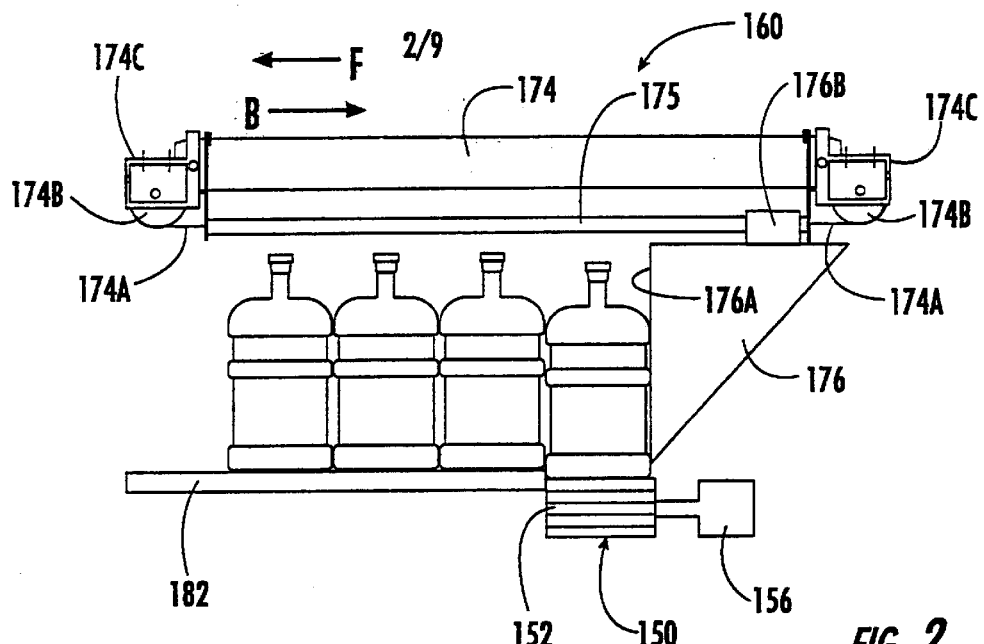
FIG. 2 is a side, fragmentary view of a staging assembly of the loading apparatus of FIG. 1.
Figure 4:
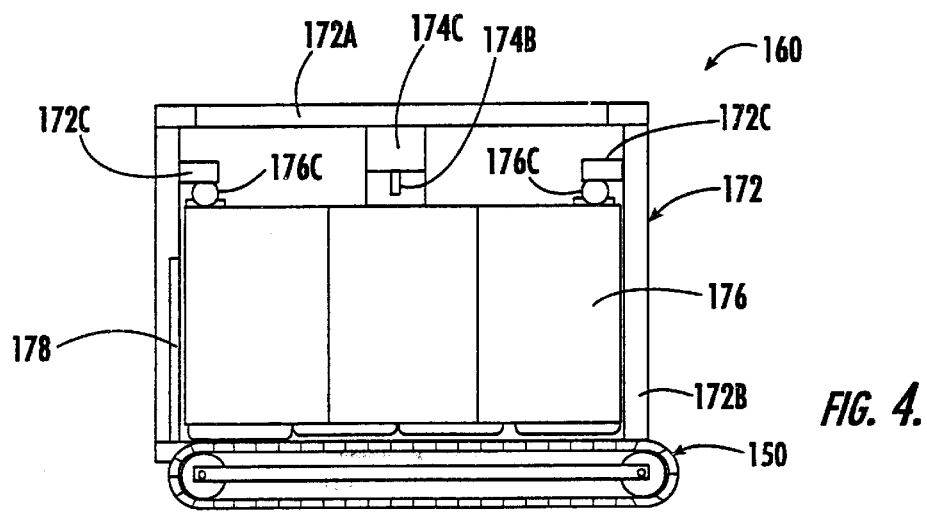
FIG. 4 is a rear, fragmentary view of the staging assembly of FIG. 2.

As best seen in FIGS. 2, 4 and 9, the staging conveyor 150 is coupled to the staging assembly 160 such that the conveyor 150 raises and lowers with the staging platform 182. As the staging platform 182 is raised from a lowermost position as shown in FIG. 6 to an uppermost position as shown in FIG. 8, the transfer conveyor 140 pivots about the wheel 145A and the hinge 134. In this manner, a smooth and uninterrupted path is provided for transferring the articles 10 between the conveyor 132 and the conveyor 150. Transport of the articles 10 is limited by a vertically extending side stop wall 178 (see FIGS. 4 and 9) which is fixed with respect to the staging platform 182.

Figure 3:
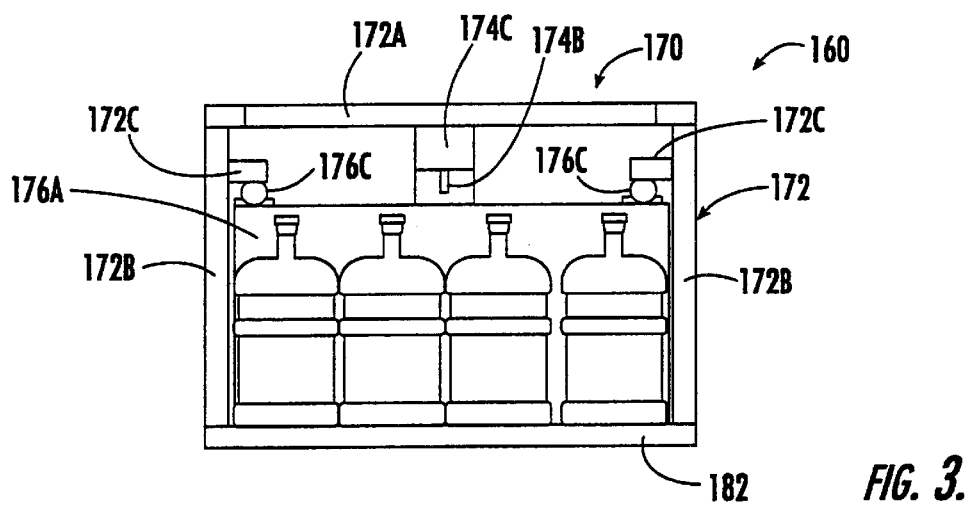
FIG. 3 is a front, fragmentary view of the staging assembly of FIG. 2.

With reference to FIGS. 2–4, a pusher assembly 170 is mounted over the staging platform 182. The pusher assembly 170 includes a frame 172 including vertical beams 172B (not shown in FIG. 2 for clarity) extending upwardly from the staging platform 182. Transverse horizontal beams 172A (not shown in FIG. 2 for clarity) are supported by the vertical beams 172B.

A drive unit 174 (see also FIG. 1) is suspended between the vertical beams 172A by means of end brackets 174C. The drive assembly 174 includes a drive means such as a hydraulic or pneumatic cylinder, a step motor or the like. The drive unit 174 includes a lengthwise guide rail 175. A cable 174A is operatively connected to the drive means, along the guide rail 175, and about pulleys 174B such that the cable may be selectively pulled by the drive means in a forward direction F and in an opposite, backward direction B, each of which is parallel to the direction of travel of the conveyor 150 (see FIG. 2).

A pusher bar 176 is connected to the cable 174A for travel therewith. More particularly, a shuttle 176B is slidably mounted on the rail 175. The shuttle 176B is secured to each of the cable 174B and the top of the pusher bar 176. Alignment of the pusher bar 176 is further maintained by lengthwise extending guide rails 172C (not shown in FIG. 2 for clarity) secured to the vertical beams 172B and slidably mounted guide brackets 176C secured to the top of the pusher bar 176. The pusher bar 176 has a forwardly facing front wall 176A.

A level sensor 192 is coupled to the staging platform 182 and detects the vertical height of the staging platform 182. A position sensor 194 detects the presence or absence of an article 10 adjacent the inlet of the conveyor 150. Suitable sensors for the sensors 192, 194, 196 will be apparent to those of ordinary skill in the art from a reading of the description herein.

The controller 190 includes a suitable programmable microprocessor or other control device as necessary to effectuate the steps and evaluations as described herein. The controller 190 receives signals from the sensors 192, 194, 196. The controller 190 generates control signals to selectively actuate the drive unit 192, the transfer conveyor gear motor 146, the staging conveyor gear motor 156, the drive means of the pusher drive unit 174 and the lift drive unit 184. Connections for such control may include hydraulic or pneumatic tubing, mechanical cabling, fiber optic cabling, electrical wire, RF transceivers or the like. A position sensor may also be provided to sense the position of the pusher bar 176 so that the controller 190 may halt movement of the pusher bar 176 when it reaches the end of the intended stroke.

The loading apparatus 100 may be operated in the following manner to load the articles 10 onto the several shelves 112, 114, 116 of the racks 110A, 110B, 110C. For the purpose of illustration, the process will be described first with respect to the loading of the lower shelf 116. It will be apparent from the description that follows that the staging platform 182 may be initially positioned at any level and the order of loading the shelves of the rack may be reversed from the order described hereinbelow.

With the rack 110B initially in the positioned occupied by the rack 110A as shown in FIG. 1, the drive unit 122 pulls the shuttle 124 to the far left end of the rack drive 122, causing the latch 126 to engage the rear edge of the rack 110B. The rack drive 122 then drives the shuttle 124 to the far right of the rack drive 122, thereby indexing the rack 10B forward and into the position in front of the staging assembly 160 as shown in FIG. 1. Close proximity between the staging assembly 160 and the rack 110B is ensured by the guide block 127.

The conveyor 132 periodically, intermittently or continuously supplies articles 10 to the transfer conveyor 140. The transfer conveyor 140 transports the articles to the staging conveyor 150. Preferably, the controller 190 selectively actuates the gear motor 146 such that the conveyor 140 only selectively advances the articles 10 to the conveyor 150 as needed to load the conveyor 150 as described hereinafter. However, it is also contemplated that the conveyor 140 may continuously supply the articles 10 to the conveyor 150. Preferably, the staging conveyor 150 is continuously driven by the gear motor 156. However, it is also contemplated that the conveyor 150 may be selectively driven, preferably under the control of the controller 190.

Initially, the conveyor belt 152 and the staging platform 182 are empty (i.e., there are no articles 10 disposed thereon) and the pusher bar 176 is disposed in a retracted position as shown in FIG. 9. Articles 10A, 10B, 10C and 10D are supplied seriatim to the running conveyor belt 152. The conveyor belt 152 continues to run so that the article 10D is stopped by the stop wall 178 and the articles 10A, 10B, 10C stack up against one another as shown in FIG. 10. The conveyor belt 152 may continue to run, sliding beneath the articles 10A, 10B, 10C, 10D (hereinafter articles 10A–10D). Once all four of the articles 10A–10D are disposed on the conveyor belt 152, the sensor 194 (FIG. 1) detects the presence of the fourth article in the leftmost location to confirm that all four articles are in place. Thereafter, the controller 190 actuates the drive unit 174 to pull the pusher bar 176 forward in the direction F as shown in FIG. 11. The pusher bar 176 thereby assembles the articles 10A–10D in a first row on the staging platform 182 adjacent the rear edge 182A of the staging platform 182. The controller 190 then actuates the drive unit 174 to pull the pusher bar 176 back in the direction B (see FIG. 12) to return the pusher bar 176 to the retracted position.

Figure 13:
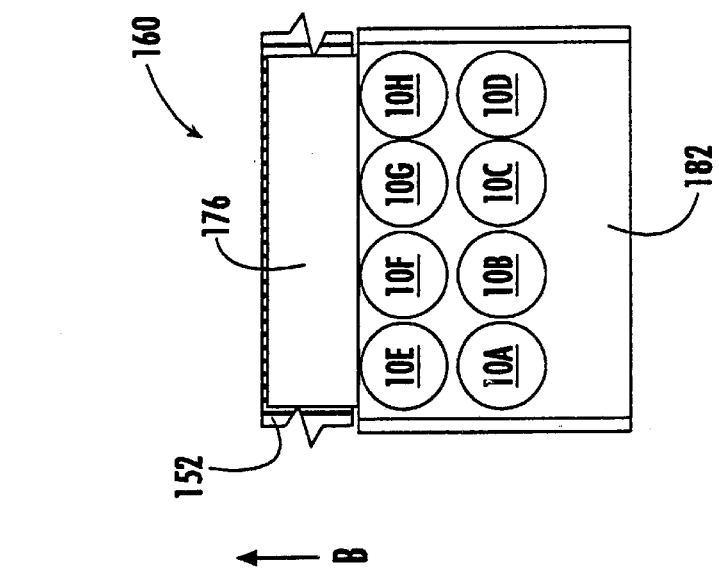
Figure 12:
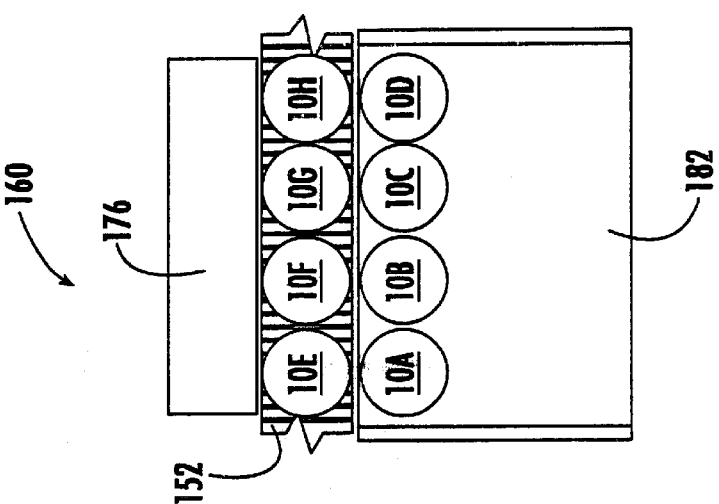

Thereafter, the transfer conveyor 140 again supplies the staging conveyor 150 with four articles 10E, 10F, 10G, 10H (hereinafter 10E–10H) which assemble in the same manner as the articles 10A–10D previously and as shown in FIG. 12. The sensor 172 again detects the presence of the fourth article 10E and the controller 190 responsively actuates the pusher bar 176 forward in the direction F to the position as shown in FIG. 13. In this manner, the pusher bar 176 advances the row of articles 10E–10H and the row of articles 10A–10D. The controller 190 again actuates the drive unit 174 to withdraw the pusher bar 176 to the retracted position.

Figure 14:
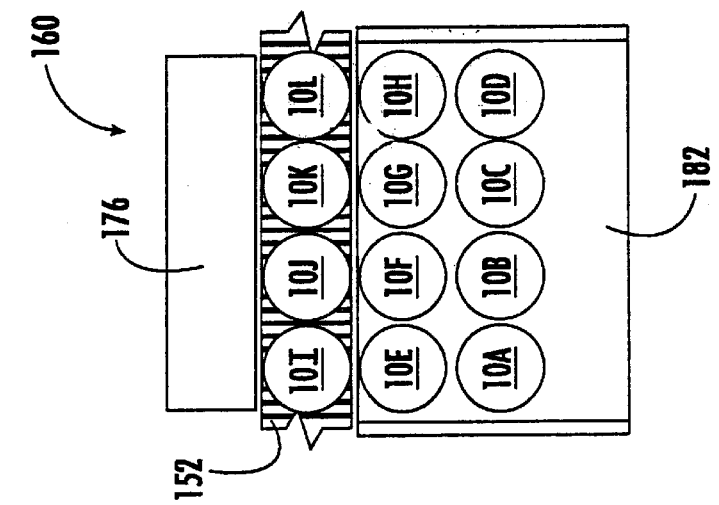

Thereafter, the transfer conveyor 140 again supplies the staging conveyor 150 with four articles 101, 10J, 10K, 10L (hereinafter 10I–10L) which assemble in the same manner as the articles 10A–10D previously and as shown in FIG. 14. The sensor 192 again detects the presence of the fourth article 101 and the controller 190 actuates the drive unit 174 to pull the pusher bar 176 forward in the direction F to the position as shown in FIG. 15. In this manner, the pusher bar 176 advances the row of articles 10A–10D, the row of articles 10E–10H, and the row of articles 10I–10L, thereby forming a four by three array of the articles 10 on the staging platform 182. The controller 190 again actuates the drive unit 174 to pull the pusher bar 176 back into the retracted position.

Thereafter, the transfer conveyor 140 again supplies the staging conveyor 150 with four articles 10M, 10N, 10O, 10P (hereinafter 10M–10P). At this time, a full four by four array 11 of the articles 10 is disposed on the conveyor belt 152 and the staging platform 182 as shown in FIG. 16. The controller actuates the drive unit 174 to pull the pusher bar 176 forward a full forward stroke such that the pusher bar front surface 176A is positioned adjacent the front edge 182B of the staging platform 182. In this manner, the pusher bar 176 sweeps the full array 11 of articles onto the shelf 116. Preferably, this actuation of the drive unit 174 requires the satisfaction of two conditions as assessed by the controller 190. First, the sensor 192 must detect that the staging platform 182 is disposed at a prescribed level corresponding to the level of the shelf 116. Second, the full array 11 of articles 10 must be present on the staging platform 182 and the conveyor belt 152.

Preferably, the controller 190 determines that the full array is present by use of a counter which counts the number of executed strokes of the drive unit 174. Alternatively, suitable photoelectric eye sensors, mechanical proximity sensors or the like may be used to detect the presence or absence of articles 10 at at least selected positions on the staging platform 182.

Some, and preferably all, of the foregoing steps of loading the articles 10 on the staging platform 182 and the conveyor belt 152 are executed while the drive unit 184 is lowering the staging platform 182 into the lower shelf loading position of FIG. 6. That is, under the control of the controller 190, as the staging platform 182 is continuously lowering, the transfer conveyor 140 feeds the staging conveyor 150 and the drive unit 174 is actuated to load the staging platform 182 in the manner described above. Movement of the lift 180 is preferably temporarily halted during the full stroke push of the pusher bar 176.

After the shelf 116 is loaded in the aforedescribed manner, the drive unit 184 raises the staging platform 182 to the level of the shelf 114 as shown in FIG. 7. As the staging platform 182 travels vertically between the levels of the shelves 116 and 114, the transfer conveyor 140, the staging conveyor 150 and the pusher assembly 170 cooperate to form a second array 11 of articles on the staging platform 182 and the conveyor belt 152. Once the staging platform 182 reaches the level of the shelf 114, the controller 190 again actuates the drive unit 174 to push the full array 11 onto the shelf 114.

Thereafter, the drive unit 184 raises the staging platform 182 to the level of the shelf 112 as shown in FIG. 8. Again, the articles 10 are staged on the staging platform 182 and the conveyor belt 152 as the staging platform 182 is being raised. The array 11 is pushed onto the shelf 112 after the staging platform 182 reaches the level of the shelf 112.

Notably, the array 11 of articles may be fully staged (as shown in FIG. 16) prior to the staging platform reaching the level of the associated shelf. Alternatively, the staging platform 182 may be raised to the level of the associated shelf, and halted while the staging assembly 160 continues to stage the full array 11 of articles 10.

While the foregoing loading apparatus 100 has been described with reference to the loading of racks 110A, 110B, 110C with articles 10 such as bottles, loading apparatus according to the present invention may be used to otherwise load or stack articles. For example, the loading apparatus may be used to vertically stack articles such as boxes, crates and the like vertically and directly on top of one another. As each layer of articles is pushed from the staging platform 182 onto the previous layer (or, for the first layer, the ground, pallet or the like), the staging platform 182 must be raised to a higher level at or above the upper surface of the new layer. The articles may be staged on the staging platform 182 while the lift 184 raises the staging platform 182 to this next level.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A loading apparatus for placing a plurality of articles on a plurality of vertically stacked shelves of a rack, said loading apparatus comprising:
   a) a staging assembly including:
      a staging platform configured to receive and support the articles, wherein said staging platform is vertically movable to a plurality of positions adjacent the shelves of the rack;
      a lift drive to raise and lower said staging platform; and
      a positioning system to position the articles on said staging platform while said lift drive is raising or lowering said staging platform and to move the articles onto the shelves of the rack; and
   b) a conveyor assembly configured to transport the articles to said staging assembly.

2. The loading apparatus of claim 1 wherein said conveyor assembly includes a transfer conveyor and a staging conveyor configured to receive the articles from said transfer conveyor, wherein said staging conveyor is movable with said staging platform and pivotally connected to said transfer conveyor.

3. The loading apparatus of claim 1 wherein:
   said staging platform is configured to support an array of the articles;
   said conveyor assembly is configured to transport the articles seriatim; and
   said positioning system is operative to position rows of the articles from said conveyor assembly onto said staging platform to form an array of the articles and to thereafter move the array of articles from said staging platform onto a shelf of the rack.

4. The loading apparatus of claim 3 wherein:
   said conveyor assembly is operative to position the articles adjacent said staging platform such that the articles are aligned along an axis; and
   said positioning system is operative to push the articles onto said staging platform in a direction substantially perpendicular to said axis.

5. The loading apparatus of claim 1 including a rack conveyor system comprising a rack drive, said rack drive operable to position the rack adjacent said staging platform.

6. A loading apparatus for vertically stacking a plurality of articles, said loading apparatus comprising:
   a) a staging assembly including:
      a staging platform configured to receive and support the articles, wherein said staging platform is vertically movable to a plurality of vertical levels;
      a lift drive to raise and lower said staging platform; and
      a positioning system to position the articles on said staging platform while said lift drive is raising or lowering said staging platform and to move the articles off of the staging platform at selected ones of said plurality of levels; and
   b) a conveyor assembly configured to transport the articles to said staging assembly.

7. The loading apparatus of claim 6 wherein said positioning system is operable to move the articles from said conveyor assembly to said staging platform.

8. The loading apparatus of claim 6 wherein said conveyor assembly includes a transfer conveyor and a staging conveyor configured to receive the articles from said transfer conveyor, wherein said staging conveyor is movable with said staging platform and pivotally connected to said transfer conveyor.

9. A loading apparatus for placing an array of articles on a plurality of vertically stacked shelves of a rack, said loading apparatus comprising:
   a) a staging assembly including:
      a staging platform configured to receive and support the array of the articles, wherein said staging platform is vertically movable to a plurality of positions adjacent the shelves of the rack;
      a lift drive to raise and lower said staging platform; and
      a positioning system to position the articles on said staging platform and to move the articles onto the shelves of the rack;
   b) a conveyor assembly configured to transport the articles to said staging assembly, said conveyor assembly including:
      a transfer conveyor configured to transport the articles seriatim;
      a staging conveyor configured to receive the articles from said transfer conveyor and to position the articles adjacent said staging platform such that the articles are aligned along an axis;
      wherein said staging conveyor is movable with said staging platform and pivotally connected to said transfer conveyor;
   c) wherein said positioning system is operative to push rows of the articles from said conveyor assembly onto said staging platform in a direction substantially perpendicular to said axis to form the array of articles while said lift drive is raising or lowering said staging platform and to thereafter move the array of articles from said staging platform onto a shelf of the rack.

10. The loading apparatus of claim 9 including a rack conveyor system comprising a rack drive, said rack drive operable to position the rack adjacent said staging platform.

11. A method for placing a plurality of articles on a plurality of vertically stacked shelves of a rack, said method comprising the steps of:
   automatically raising or lowering a staging platform to a position adjacent a selected shelf of the rack;
   automatically placing the articles on the staging platform while the staging platform is raising or lowering; and
   thereafter, automatically moving the articles from the staging platform to the selected shelf.

12. The method of claim 11 wherein said step of placing the articles on the support platform includes:
   transporting the articles to a position adjacent the staging platform while the staging platform is raising or lowering; and
   pushing the articles onto the staging platform while the staging platform is raising or lowering.

13. The method of claim 11 wherein said step of placing the articles on the support platform includes:
   transporting a first row of the articles to a position adjacent the staging platform while the staging platform is raising or lowering;
   thereafter, pushing the first row of the articles onto the staging platform while the staging platform is raising or lowering;
   thereafter, transporting a second row of the articles to a position adjacent the staging platform while the staging platform is raising or lowering;
   thereafter, pushing the second row of the articles onto the staging platform and adjacent the first row of the articles while the staging platform is raising or lowering to form an array of the articles on the staging platform; and
   thereafter, pushing the array of the articles from the staging platform onto the selected shelf of the rack.

14. The loading apparatus of claim 1 including a controller operative to automatically control said lift drive and said positioning system.

15. The loading apparatus of claim 6 including a controller operative to automatically control said lift drive and said positioning system.

16. The loading apparatus of claim 9 including a controller operative to automatically control said lift drive and said positioning system.

17. A loading apparatus for placing a plurality of bottles on a plurality of vertically stacked shelves of a rack, said loading apparatus comprising:
   a) a staging assembly including:
      a staging platform configured to receive and support the bottles such that the bottles are vertically oriented, wherein said staging platform is vertically movable to a plurality of positions adjacent the shelves of the rack;
      a lift drive to raise and lower said staging platform; and
      a positioning system to position the bottles on said staging platform and to move the bottles onto the shelves of the rack such that the bottles are vertically oriented on the shelves of the rack; and
   b) a conveyor assembly configured to transport the bottles to said staging assembly such that the bottles are vertically oriented;
   c) wherein said positioning system is operative to position the bottles on said staging platform while said lift drive is raising or lowering said staging platform.

18. A method for placing a plurality of bottles on a plurality of vertically stacked shelves of a rack, said method comprising the steps of:
   raising or lowering a staging platform to a position adjacent a selected shelf of the rack;
   placing the articles on the staging platform while the staging platform is raising or lowering such that the bottles are vertically oriented; and
   thereafter, moving the bottles from the staging platform to the selected shelf such that the bottles a re vertically oriented on the selected shelf.

19. A loading apparatus for placing a plurality of articles on a plurality of vertically stacked shelves of a rack, said loading apparatus comprising:
   a) a staging assembly including:
      a staging platform configured to receive and support an array of the articles, wherein said staging platform is vertically movable to a plurality of positions adjacent the shelves of the rack;
      a lift drive to raise and lower said staging platform; and
      a positioning system to position the articles on said staging platform and to move the articles onto the shelves of the rack; and
   b) a conveyor assembly configured to transport the articles to said staging assembly seriatim;
   c) wherein said positioning system is operative to:

push rows of the articles a first push distance from said conveyor assembly onto said staging platform to form an array of the articles; and thereafter push the array of articles a second push distance from said staging platform onto a shelf of the rack;

wherein the second push distance is greater than the first push distance; and d) wherein said positioning system is operative to position the articles on said staging platform while said lift drive is raising or lowering said staging platform.

20. A method for placing a plurality of articles on a plurality of vertically stacked shelves of a rack, said method comprising the steps of:

raising or lowering a staging platform to a position adjacent a selected shelf of the rack;

transporting a first row of the articles to a position adjacent the staging platform while the staging platform is raising or lowering;

thereafter, pushing the first row of the articles a first push distance onto the staging platform while the staging platform is raising or lowering;

thereafter, transporting a second row of the articles to a position adjacent the staging platform while the staging platform is raising or lowering;

thereafter, pushing the second row of the articles a second push distance onto the staging platform and adjacent the first row of the articles while the staging platform is raising or lowering to form an array of the articles on the staging platform; and thereafter, pushing the array of the articles a third push distance from the staging platform onto the selected shelf of the rack;

wherein the third push distance is greater than each of the first and second push distances.

21. The method of claim 20 wherein the first and second push distances are the same.

* * * * *